Figure 5:
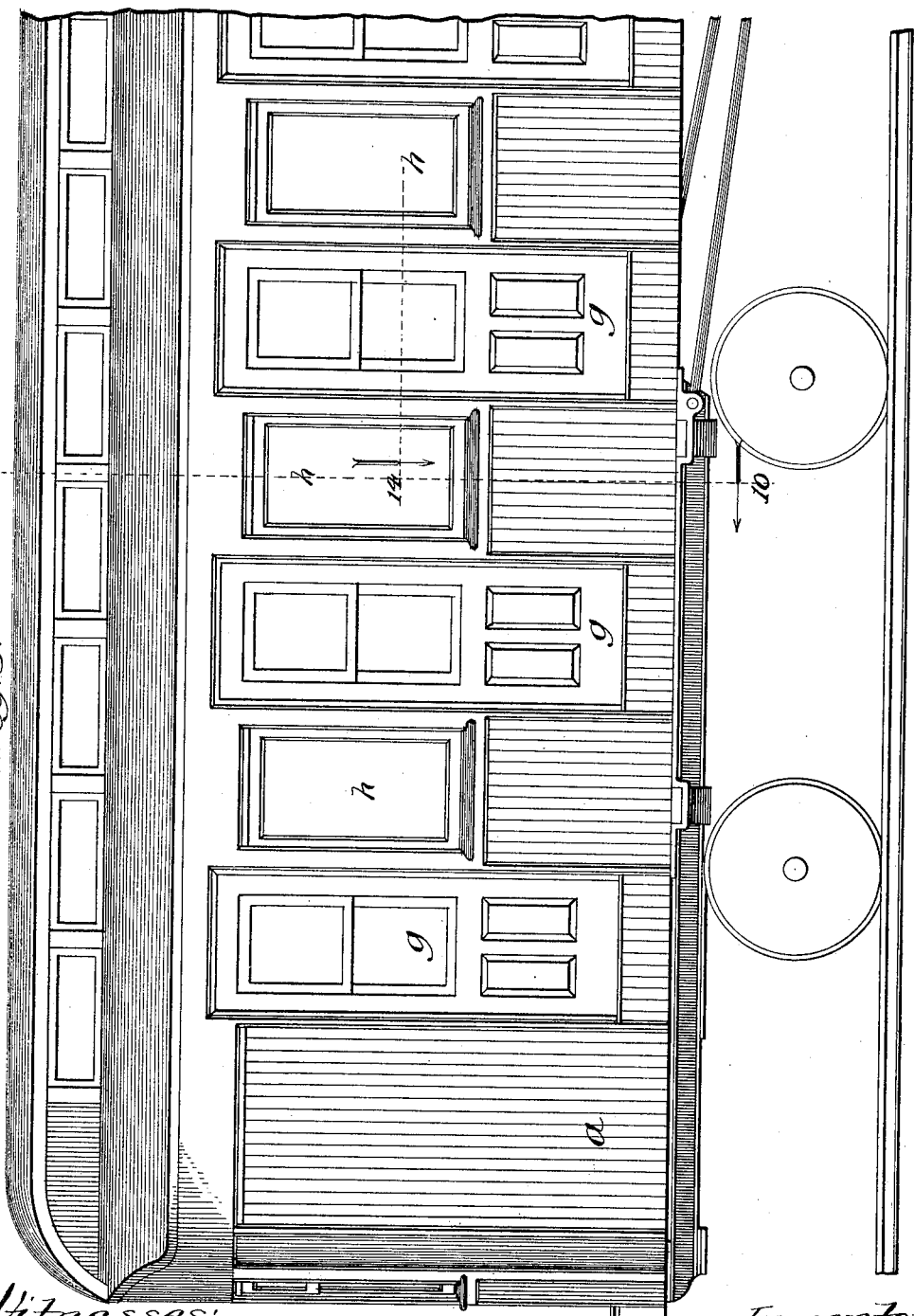

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 1.
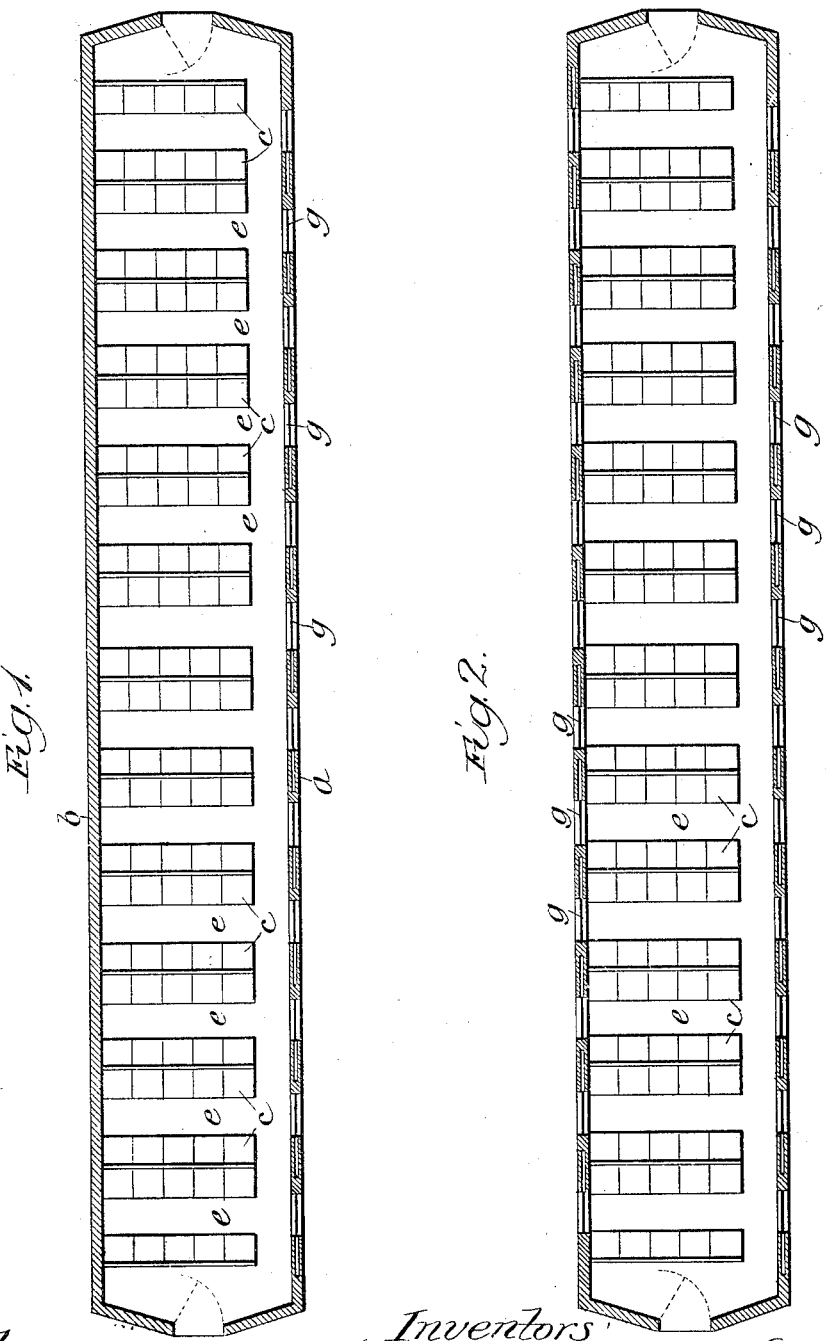

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 2.
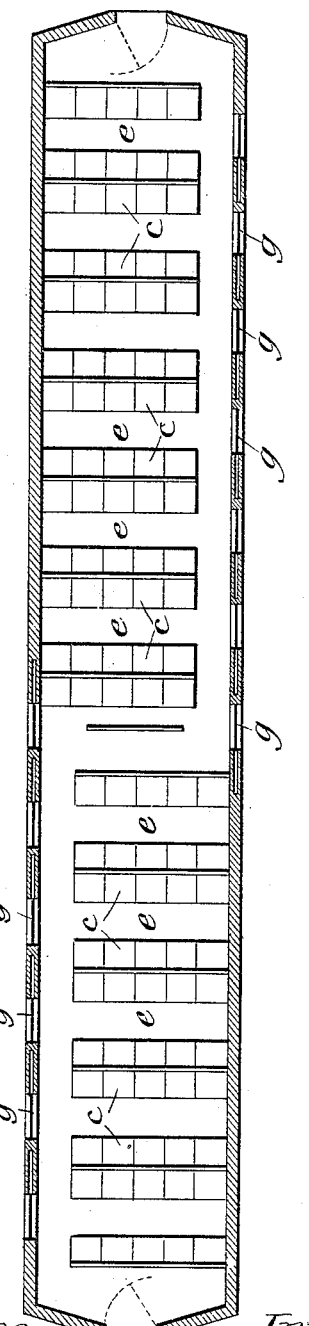
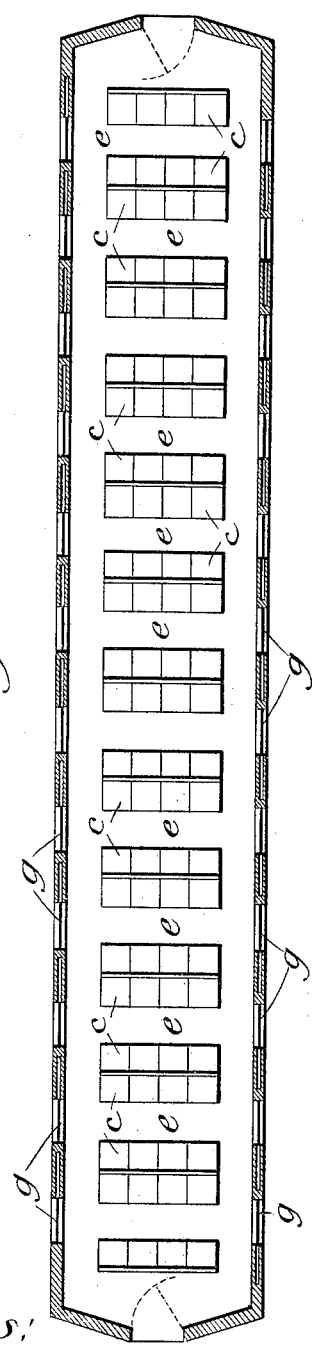

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 3.

Witnesses:
Chas. E. Gaylord,
Geo. C. Davison.

Inventors:
Albert W. Sullivan,
William Renshaw,
By Thomas F. Sheridan,
Atty.

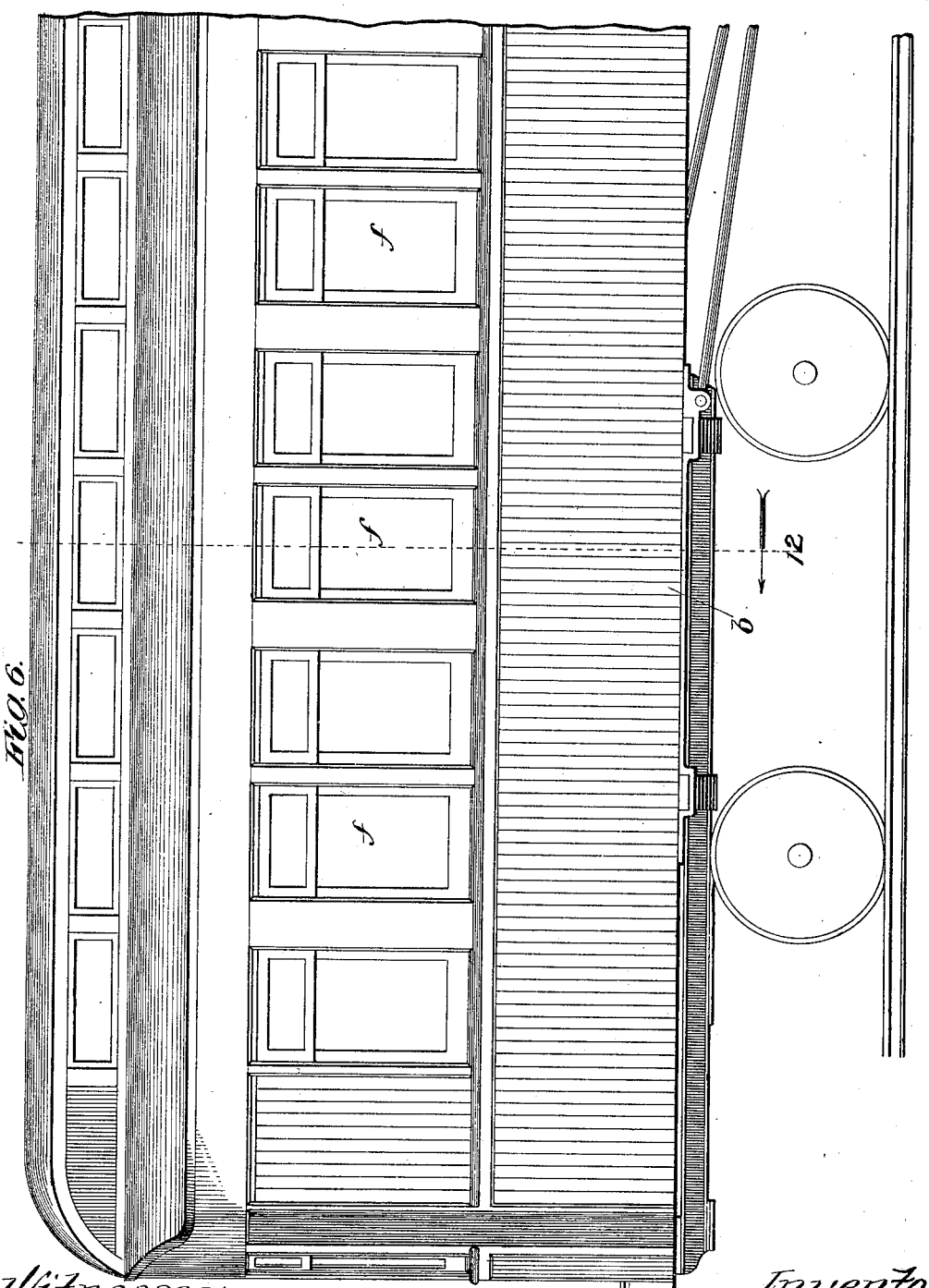

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 5.
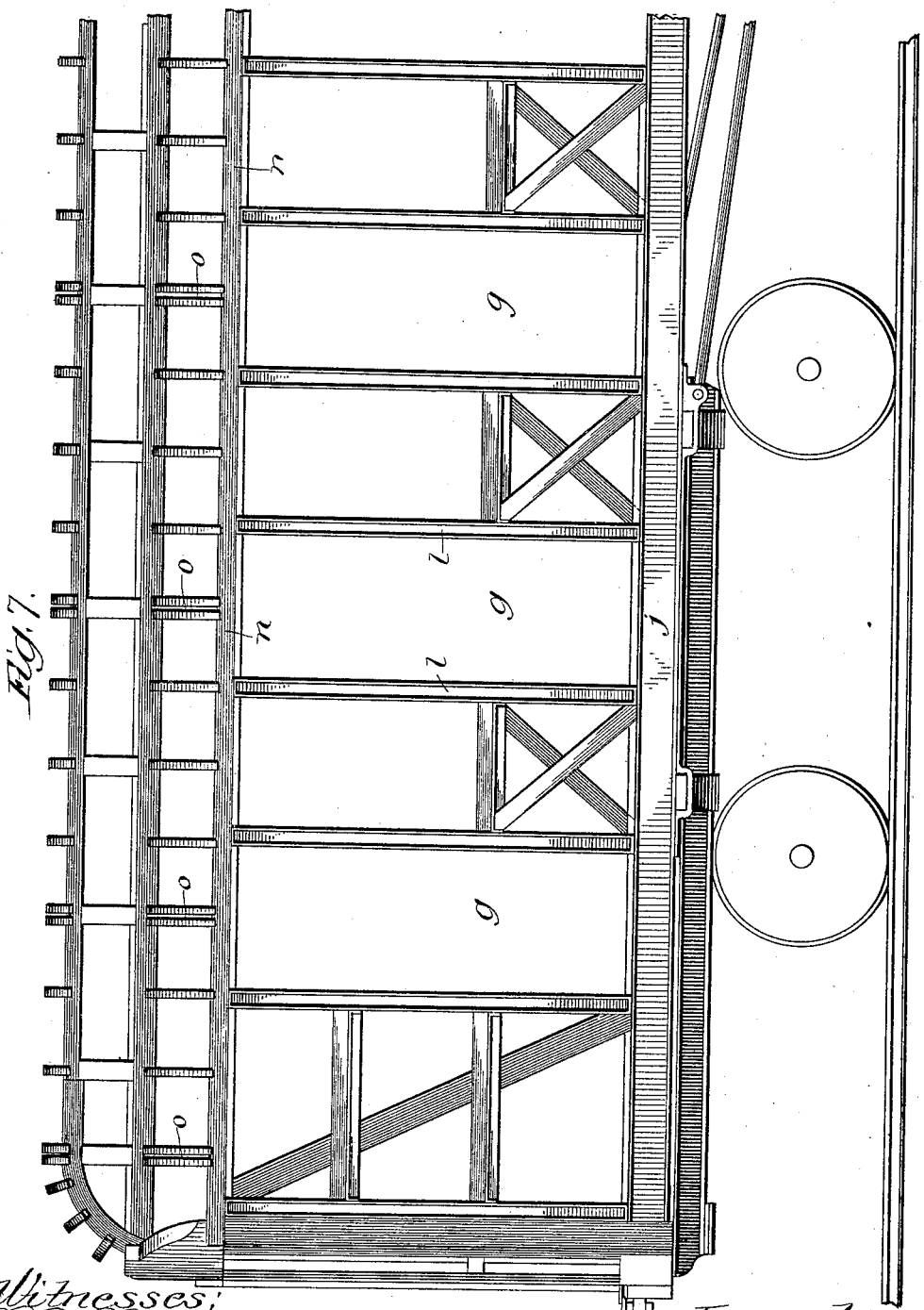

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 6.
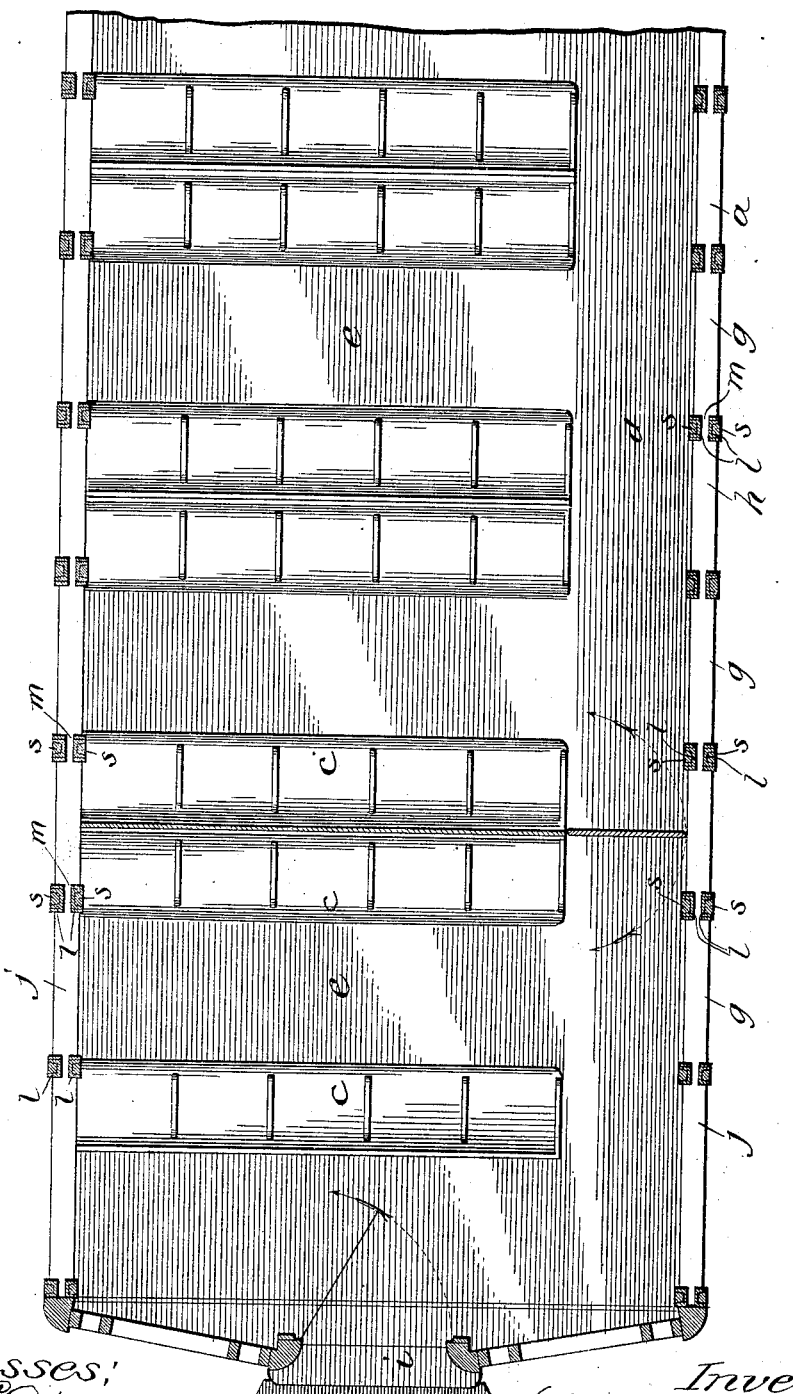

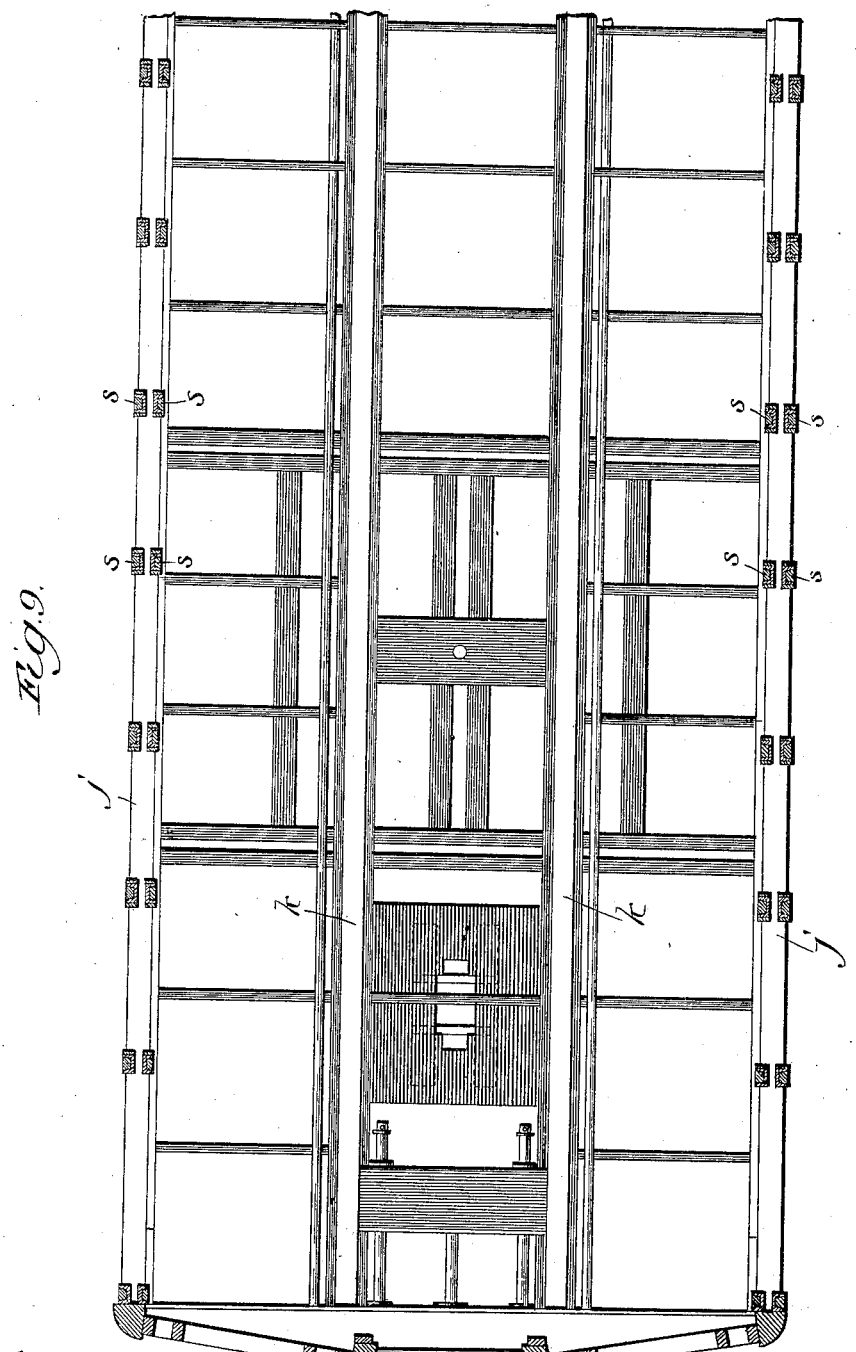

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 8.
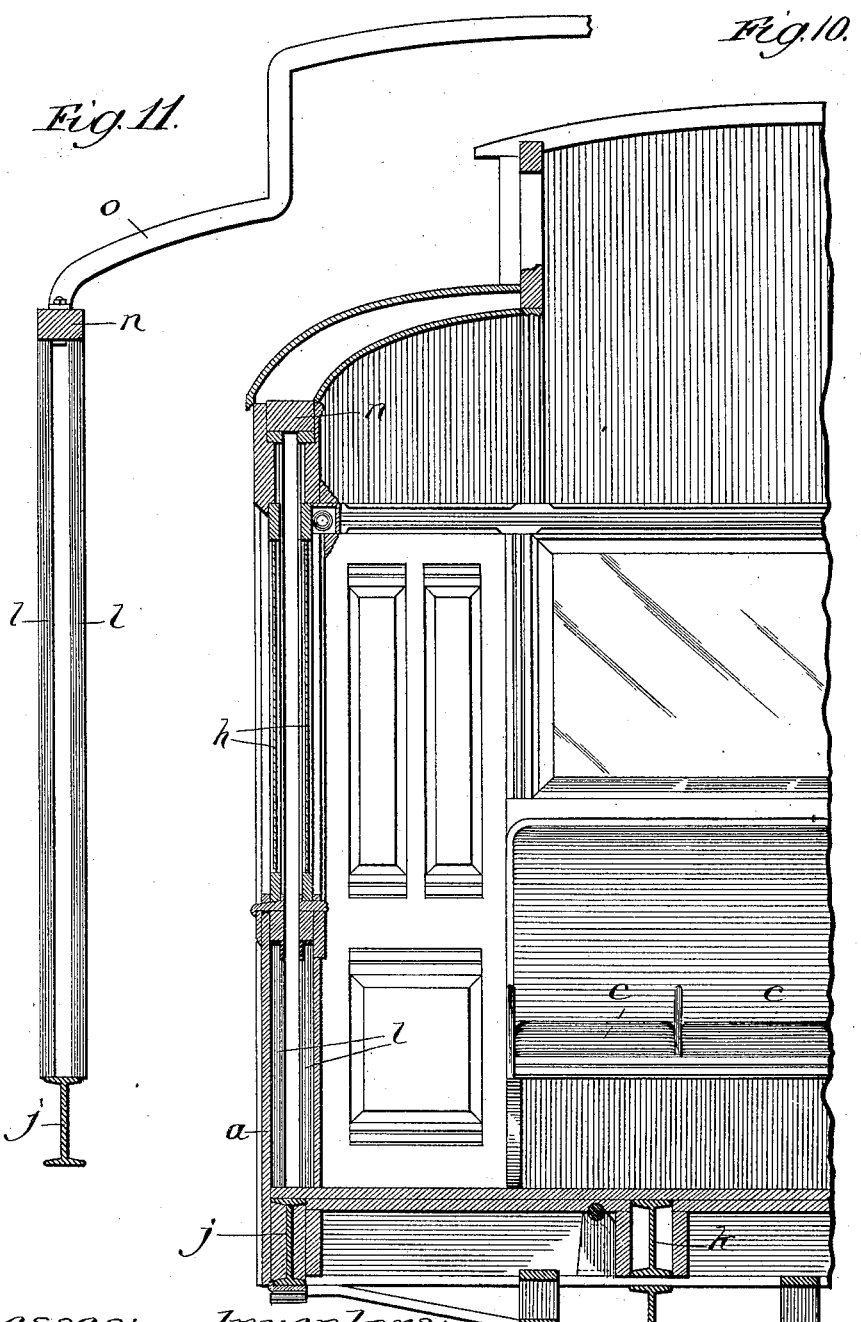

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 9.
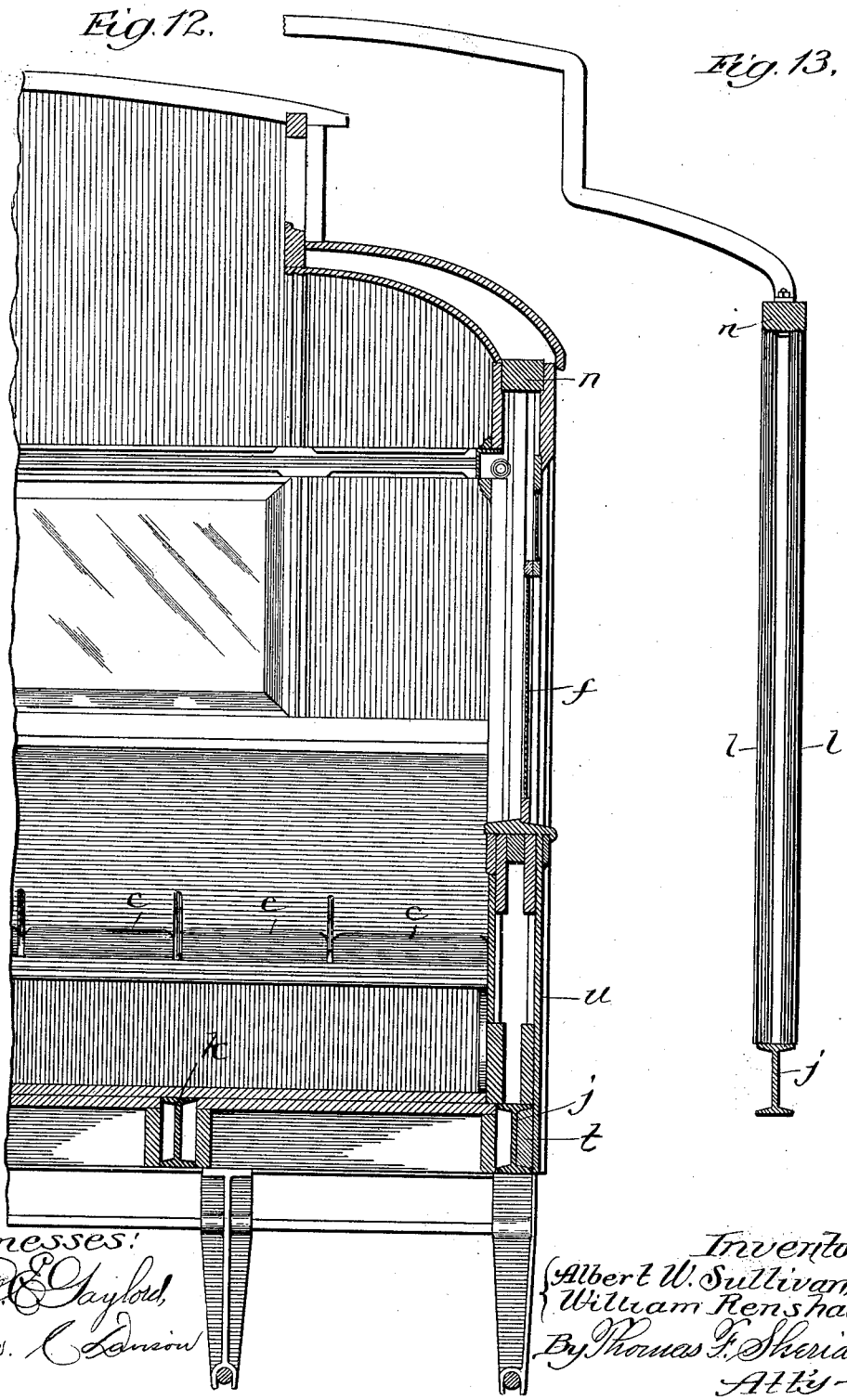

No. 686,959. Patented Nov. 19, 1901.
A. W. SULLIVAN & W. RENSHAW.
RAILWAY PASSENGER COACH.
(Application filed Apr. 13, 1901.)
(No Model.) 10 Sheets—Sheet 10.
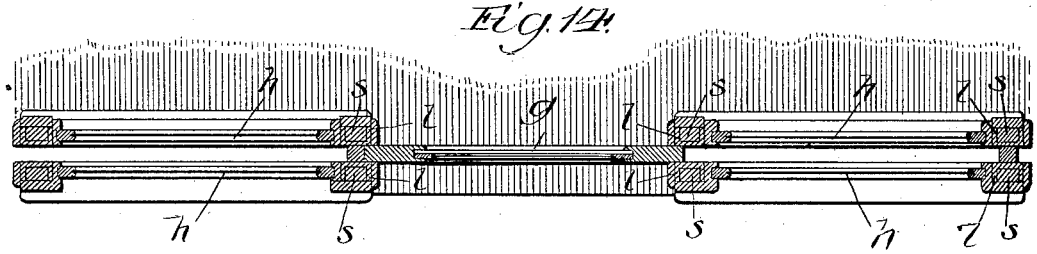
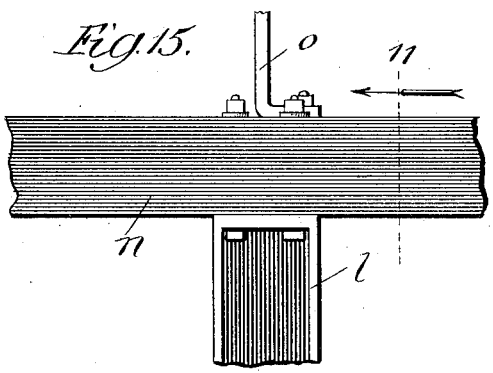
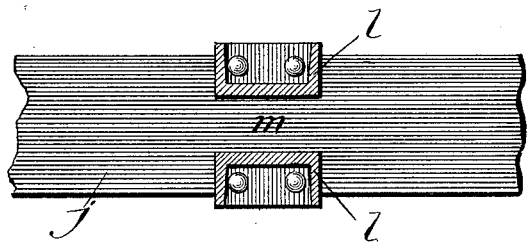
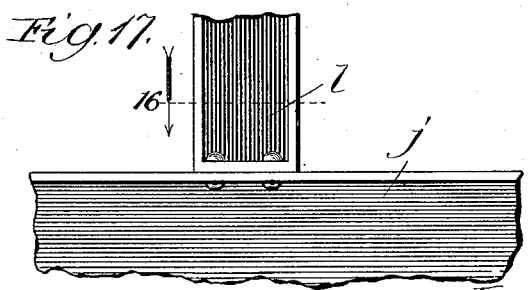
Witnesses:
Inventors:
Albert W. Sullivan,
William Renshaw,
By Thomas F. Sheridan,
Atty.

United States Patent Office.

ALBERT W. SULLIVAN AND WILLIAM RENSHAW, OF CHICAGO, ILLINOIS.

RAILWAY PASSENGER-COACH.

SPECIFICATION forming part of Letters Patent No. 686,959, dated November 19, 1901.

Application filed April 13, 1901. Serial No. 55,637. (No model.)

*To all whom it may concern:*

Be it known that we, ALBERT W. SULLIVAN and WILLIAM RENSHAW, citizens of the United States, residing at Chicago, in the county of Cook and State of Illinois, have invented certain new and useful Improvements in Railway Passenger-Coaches, of which the following is a specification.

The invention relates to the arrangement and construction of passenger-coaches, and particularly to the form, arrangement, and construction of the metallic members which go to make up the supporting members or frame of the car, by which a certain arrangement of seats is obtained, all of which will more fully hereinafter appear.

The principal object of this invention is to provide a simple, economical, and efficient passenger-coach of such construction and arrangement that the car can be economically operated—that is, the passengers admitted and discharged with the greatest possible speed.

A further object is to provide a passenger-coach in which the supporting members are largely made of metal beams of substantial form and arrangement to carry the superstructure.

Further objects will appear from an inspection of the drawings and the following description and claims.

The invention consists principally in a passenger-coach having a plurality of side-door openings provided with side sills formed of I-beams and side posts formed of channel-beams, with their web portions extending longitudinally, and their flange portions extending transversely, of the car.

The invention consists, further, in a passenger-coach having a plurality of side doors provided with side sills formed of metal I-beams, side posts formed of metal channel-beams with their web portions extending longitudinally and their flanges extending inwardly and outwardly from the inner and outer beams, respectively, and seats extending transversely of the car and providing a longitudinal aisle between the ends of the seats and the side of the car.

The invention consists, further and finally, in the features, combinations, and details of construction hereinafter described and claimed.

In the accompanying drawings, Figure 1 is a plan view of one arrangement of car and seats when constructed in accordance with our improvements; Fig. 2, a plan view of a second arrangement of seats; Fig. 3, a plan view of a third arrangement of seats; Fig. 4, a plan view of a fourth arrangement of seats in a car as made possible with these improvements; Fig. 5, a side elevation of a portion of the near side of a car as it appears when constructed in accordance with our improvements; Fig. 6, a side elevation of a portion of the far side of the car as is possible when constructed with our improvements; Fig. 7, an elevation of the skeleton frame of a portion of one side of the car as it appears when constructed in accordance with these improvements; Fig. 8, a plan sectional view of a portion of the interior of a car which is made possible when constructed in accordance with these improvements, taken on a line just above the seats of the car, looking at it from above; Fig. 9, a plan sectional view of a portion of a car constructed in accordance with these improvements looking at it from above and showing the underpinning or framework of the car; Fig. 10, an enlarged sectional elevation of a car constructed in accordance with these improvements, taken on line 10 of Fig. 5, looking in the direction of the arrow; Fig. 11, a skeleton view of the carline and one of the supporting posts and sills; Fig. 12, a broken elevation forming practically a continuation of Fig. 10; Fig. 13, a skeleton view of part of the supporting-framework forming a continuation of Fig. 11; Fig. 14, an enlarged plan sectional detail of a portion of the car, showing a sliding door, taken on line 14 of Fig. 5, looking in the direction of the arrow; Fig. 15, an enlarged side elevation of the upper portion of the supporting posts and plate shown in Fig. 11; Fig. 16, a plan sectional view of the mechanism shown in Fig. 17; and Fig. 17, a broken elevation of the lower end of the mechanism shown in Fig. 15—that is, the side sills and a portion of the lower ends of the posts.

In this particular art it is well known that the American passenger-coach of this day has attained its present splendid condition as the result of a multitude of step-by-step improvements which have extended over a comparatively long period of time and that it has become practically a recognized fact that it is substantially perfect. Without desiring to detract in the least from the splendid results which have been accomplished, it still remains a fact that the cars employed, particularly in suburban service, contain very serious objections, the first and most important being the loss of time in admitting and discharging passengers.

In suburban traffic the cars are made in three ways—one in which the seats are arranged at each side of the car longitudinally thereof and in which the side of the car forms the back of the seat, the car being provided with two doors, one at each end thereof, by which ingress and egress is had. The second type of cars is the class which is the oldest and in which the seats are arranged transversely from each side to a point near the center, forming an aisle in the center of the car in line with the doors at each end. The third class, and that probably used the most on suburban and elevated trains, is of a composite type, on which some of the seats at the central portion extend transversely of the car from each side to a central aisle, while each end of the car is provided with seats arranged longitudinally thereof, with the sides forming backs therefor. A characteristic feature of all three types of car mentioned is the end doors, necessitating in a car seating sixty people that thirty shall pass slowly in single file out of the door at each end to empty the car and that thirty shall afterward enter the car slowly in single file through the door at each end to reload the car, a process of loading and unloading productive of much delay in the movement of the train. During these operations the doors at both ends of the car are wide open, permitting a strong draft to pass entirely through the car in cold and inclement weather, thereby chilling it and causing discomfort to the passengers. These objections are inseparably associated with these types of cars and are the ones chiefly sought to be overcome in the improvements herein described.

The principal object of our invention, therefore, is to provide a car which will obviate the above-named objections in that the end doors, so far as the loading or unloading of passengers at stations is concerned, and the old central aisle are dispensed with—that is, a car in which the seats extend transversely thereof from one side only to form a longitudinal side aisle and which are arranged back to back, the car being further provided with a door in the side wall opposite each pair of seats, so that when the entire car is to be unloaded no more than ten persons are required to pass out of any one door and that no more than ten persons are required to enter at any one door to reload. In these operations the distance required to be traversed in unloading and also in reloading is only the width of the car—say, ten feet, as against one-half the length of the car, or, say, thirty feet in cars of the end-door type. It is further to be observed that in the improved car herein described the unit of area of the car tributary to each door is that of one section or seating capacity for ten passengers and that this relation remains constant, regardless of the length of the car or of the number of sections it may contain, so that a long car arranged upon this plan may be unloaded and reloaded in exactly the same length of time as a short car, whereas in cars of the end-door type the longer they are made the longer the process of unloading and reloading. The effect of the improved arrangement of car design and construction herein described is to greatly increase the transportation capacity of the railroad by making practicable the use of longer cars, and thereby lessening the number of cars used for the transportation of a given number of passengers, thus permitting an increase in the number of trains that can be moved upon a railroad in a given time. This result, which is of vital importance in the development of rapid transportation, cannot be accomplished with cars of the end-door type for the reason that time consumed in the loading and unloading of passengers increases directly in proportion to the increased length of the cars, thereby imposing a limit to extension in that direction. It therefore necessarily follows that an increase of transportation capacity of a railroad using the end-door type of car can only be made by increasing the number of trains run, whereas with the type of car herein described the transportation capacity of a railroad can be increased by enlarging the cars, by increasing the number of trains, and by lessening the time consumed in receiving and discharging passengers, with added safety and facility. The equation of two of these elements of improved transportation, those of time and increased car capacity, yields an increased ratio of transportation capacity in the proportion of six to one. Thus in discharging a car of sixty passengers through two end doors the time consumed under normal conditions is thirty seconds, whereas with the improved car herein described, having a capacity of one hundred and twenty passengers, the time consumed in discharging the entire number under normal conditions will not exceed ten seconds—two passengers per second in one case against twelve passengers per second in the other. Similarly, the operation of receiving passengers will be equally expedited.

The placing of the doors in one side of the car eliminates the condition of opposite openings, so that drafts are not produced through the car, which, together with the lesser time that the doors are required to remain open, relieve the passengers from much of the exposure and discomfort incident to the use of end-door cars in cold and inclement weather.

The advantages that accrue in the rapid reception and discharge of passengers in a car as herein described, with seats arranged transversely and a side aisle next to the side doors, are unique and do not obtain under any other arrangement of seats, aisle, and doors. The combination of seats, aisle, and doors herein described is the only one which will admit of passengers at once entering a car at any of its numerous doors and thereafter when the train has resumed motion distributing themselves throughout the car or by means of the aisles and connecting end doors throughout the train without disturbing any of the passengers previously seated. This feature of equalization in the distribution of passengers throughout a car or train in motion is one that has heretofore been possible only with cars having end doors and a center aisle, such cars having seats for only four passengers transversely and the use of the center aisle being attended with all the disadvantages of slow entrance through the end doors.

In cars having transverse seats and side doors without an aisle the equalization of distribution must take place upon the station-platform after the arrival of the train, necessitating the opening of many doors and an examination of the train in many places before vacant seats in cars nearly full can be found, thereby causing much annoyance and discomfort to passengers already seated and great delay to the train, after the manner of conducting transportation in Great Britain and many of the European countries.

As above suggested, side-door cars have been used in foreign countries; but it is well known that such cars are very short, have a small carrying capacity, and are totally unfit to meet the traffic demands of the United States. In fact, hitherto it has been thought impossible to make a passenger-coach of the standard American type and provide it with a plurality of side doors without so weakening the supporting-structure as to make it decidedly dangerous to use, and until the present improvements were made no solution of this problem seemed possible. Without dwelling on various objections it is well known that all passenger-coaches are trussed and strengthened at a point above the underpinning and between the sheathing forming the side walls of the coach, so that if these were cut through it would produce a car of undue weakness with no way of compensation therefor. Even in composite baggage and passenger coaches, where one side baggage-door is used, the length of the car is limited and extra trussing of the superstructure has to be provided, all of which is well known in the art. It will be seen, therefore, that these improvements are not merely a substitution of materials or the result of mere study on the part of a mechanic, but that they consist in an entire reconstruction and rearrangement—in fact, a radical departure from existing methods.

In illustrating and describing these inventions we prefer to do so in connection with a car that is particularly adapted to suburban traffic, one that may have sliding doors in one or both sides arranged to slide into and out of a space formed in the side walls of the car, and in illustrating the invention we have preferably shown the side supporting-posts as constructed and arranged for this purpose on both sides of the car. It will be understood, however, that we do not desire to be limited strictly to this method of construction and arrangement, for the reason that should it be found desirable to place the sliding doors on one side of the car only then of course it will be readily understood that the new structure need only be embodied in that side of the car in which the sliding doors are mounted, as such side of the car will be the only weakened side. The other side of the car will practically remain intact if sliding doors are not supplied thereto and may be constructed and arranged in accordance with any of the existing methods, though, as above suggested, we prefer to make both sides of the car of the same construction and arrangement of material and elements.

In constructing a car in accordance with these improvements we provide a car-body having side walls $a$ (see Figs. 1, 2, and 8) at the near side and $b$ at the far side. By "near" we mean that side which is preferably arranged adjacent to the station-platform, the "far" side being the side remote therefrom. It will be understood that this type of cars is adapted particularly and practically for use in connection with stations having a platform substantially on a level with the floor of the car, such as now in common use in connection with the elevated railroads of this country. In order to provide for the comfort of passengers and economical loading and unloading at desired stations, we provide seats $c\,c$, which extend transversely of the car from the far side, (in the types shown in Figs. 1, 2, and 8,) to which they are attached to a point a slight distance from the near side of the car. These seats are preferably so arranged—that is, back to back—in relation to the near side of the car that they form an aisle $d$ between the end thereof and the near side of the car and spaces $e$, which permits the passengers to have easy access to and from the seats whenever desirable or necessary with the least possible discomfort to the occupants of the car. The far side of the car is provided, as shown in Figs. 1, 2, and 6, with windows $f$ only, there being no doors on this side of the car, which thereby prevents passengers from leaving the car on the side opposite the station-platform. The near side of the car, however, as shown in Figs. 1, 2, and 5, is provided with doors $g$ opposite the spaces $e$, between each pair of seats and with windows $h$ opposite the center of the backs of each pair of seats.

If desired, each car may be provided with a vestibule-opening $i$ at each end thereof, arranged in line with the vestibule-opening in the next adjacent car and at the center thereof, so that passengers may have access to the next car or may pass from car to car of the train; but as the ends of the car are not provided with platforms or steps it will be seen that when a train of cars is coupled together there is no means by which passengers may leave the train or have admission thereto—to the station-platform—through the ends of the cars, thus preserving the passengers from danger as well as from the inclemency of the weather. By the arrangement of the sliding doors it will be seen that when a passenger is desirous of leaving a particular seat he may pass through the door directly opposite his seat and enter upon the platform of the station, and when the passengers are desirous of entering a car they can do so at any one of the doors which may be nearest to them and remain in the aisle or pass down the same to such seat or seats as may be vacant, the advantages of which will be thoroughly appreciated by those skilled in the art.

It is highly desirable that a car of this class, as above described, should be made as long as possible consistent with the strength of the materials to be used and provide for the greatest comfort of the passengers, and it may be made to seat one hundred passengers or more—even one hundred and twenty. This will be more fully appreciated when it is known that the present coaches used in suburban traffic seat only about sixty passengers. In constructing a car, therefore, that will accommodate this number of passengers with safety it is desirable to use metal supporting members wherever possible, using wood practically and only for fillers where it is necessary to attach the panels, sheathing, or other members of the car thereto. In order to accomplish this result and provide for the framework of the car, we provide side sills $j$ and intermediate sills $k$, formed of metal I-beams, with their web portions arranged in vertical planes and their flanges in horizonal planes, upon and to which the flooring and other superstructures may be attached.

To provide for the superstructure of the car on the sides thereof and in which the sliding doors may be mounted and the roof supported, side supporting-posts, formed of channel-beams $l$, are provided and arranged back to back—that is, the web portions are arranged longitudinally of the car to provide, as it were, a double wall having a space or spaces $m$, in which the sliding doors may enter. These channel-beams have their flanged portions on the outer beam extending outwardly and on the inner extending inwardly, as shown particularly in Figs. 8 and 9. The upper and lower web portions of each channel-beam forming the side post are bent between the side flanges and butt-welded thereto, so as to make it one solid integral structure, and at such points is riveted to the flanges of the side sills and the upper side plate, so as to secure such portions together in an effective and workmanlike manner. Resting on the upper ends of these side posts, as above suggested, and secured thereto is a horizontal piece of timber, or what is technically termed a "plate" $n$, to which the carlines $o$ are secured by means of the bolts $p$. These carlines extend from one plate $n$ and are bent inwardly and upwardly in the desired shape, as shown particularly in Figs. 11 and 13, across to the plate on the other side of the car, thus tying such members together in a very efficient manner. These carlines are braced and secured together in the usual manner, as shown in Figs. 7, 10, 12, and 13, to hold and support the roof of the car, and therefore require no detailed description here.

From the foregoing it will be seen that the side supporting-posts of the car are formed of channel beams or irons, with their webs arranged longitudinally of the car and adjacent to each other to form a space between which the sliding doors may enter, and with their flanges extending inwardly on the inner beam toward the center of the car and on the outer away from the center, and are so very efficient in resisting the stress and strains incident to the use of the car that the usual trusses can be dispensed with above the sills and permit of the use of side door-openings. A careful examination of the drawings will disclose the fact that these side metallic posts are of such construction and arrangement that they tie the underframing and the superstructure together in a very strong manner and really act similar to a truss.

The posts on both sides of the car are provided with fillers of wood $s$, to which the sheathing and inner panel-work of the car may be secured. The side sills are also provided with fillers of wood to which the sheathing $u$ may be secured.

The sliding doors may be slidingly mounted on the car by means of the usual door-hangers, (not shown,) so that they may, as shown in Fig. 14, enter the space between the double walls on the near side of the car. These double walls are provided with windows $h$, hereinbefore mentioned, but which are arranged in a double manner, one in the outer part of the wall and the other in the inner part, and which make the cars easy to heat, and therefore very comfortable in cold weather. The far side of the car, however, we prefer to provide with the single windows $f$, above alluded to, as shown particularly in Fig. 6; but it may also have doors when arranged as shown in Figs. 2 and 4. The vestibule-opening $i$ may be provided with doors, preferably swinging, as shown in Fig. 8, by which they may be closed when the cars are used singly or when such car is at the rear end of the train.

We claim—

1. A car of the class described having a plurality of side doors, provided with side sills formed of I-beams, and side posts formed of channel-beams with their web portions extending longitudinally and their flanged portions extending transversely of the car, substantially as described.

2. A car of the class described having a plurality of side doors, provided with side sills formed of I-beams, side posts for the side of the car formed of channel-beams having their web portions arranged longitudinally of the car to provide spaces between them and with their flanges on the inner channel-beam extending inwardly and the flanges on the other channel-beam extending outwardly, and carlines supported on and connected to the side sills by such side posts, substantially as described.

3. A car of the class described having a plurality of side doors, provided with side sills formed of metal I-beams, side posts formed of metal channel-beams with their web portions extending longitudinally of the car and providing a door-space between them and their flanges extending inwardly from the inner channel-beam and outwardly from the outer channel-beams, and seats extending transversely of the car and attached to the far sides only and providing a longitudinal aisle between the ends thereof and each side, substantially as described.

4. A car of the class described having a plurality of side doors, provided with side sills formed of metal I-beams, side posts formed of metal channel-beams with their web portions arranged longitudinally of the car and providing a door-space between them and their flanges extending inwardly from the inner channel-beams and outwardly from the outer channel-beams, seats extending transversely of the car and attached to the far side of the car only and providing a longitudinal aisle between the ends of the seats and such side, and doors arranged in the near side of the car, one opposite the space between each pair of seats and slidingly mounted so as to pass between the channel-beams on such side of the car, substantially as described.

5. A car of the class described having a plurality of side doors, provided with side sills formed of metal I-beams, side posts formed of metal channel-beams arranged in pairs with their web portions arranged longitudinally of the car and adjacent to each other and providing a door-space between them and their flanges extending inwardly from the inner channel-beam and outwardly from the outer channel-beam, seats arranged in pairs back to back extending transversely of the car from and attached to the far side thereof and providing a longitudinal aisle between their ends and the near side of the car, windows in the near side of the car, and a plurality of sliding doors in the near side, one arranged opposite each pair of seats, substantially as described.

6. In a car of the class described having a plurality of side doors provided with side sills formed of I-beams, side posts formed of metal channel-beams with their web portions extending longitudinally of the car and providing a door-space between them, the flanges extending inwardly and outwardly from the inner and outer channel-beams, respectively, and seats extending transversely of the car and providing a longitudinal aisle between the ends thereof and the sides, substantially as described.

ALBERT W. SULLIVAN.
WILLIAM RENSHAW.

Witnesses:
  THOMAS F. SHERIDAN,
  HARRY IRWIN CROMER.